United States Patent [19]

Matsuura

[11] 4,311,375
[45] Jan. 19, 1982

[54] LIGHT MEASURING CIRCUIT FOR PHOTOGRAPHIC CAMERAS

[75] Inventor: Tsuyoshi Matsuura, Ina, Japan

[73] Assignee: Olympus Optical Co., Ltd., Tokyo, Japan

[21] Appl. No.: 143,108

[22] Filed: Apr. 23, 1980

Related U.S. Application Data

[63] Continuation-in-part of Ser. No. 948,528, Oct. 4, 1978, abandoned.

[30] Foreign Application Priority Data

Oct. 18, 1977 [JP] Japan .................. 52/121110

[51] Int. Cl.³ .......................................... G03B 7/00
[52] U.S. Cl. ...................... 354/60 R; 354/51; 354/60 E
[58] Field of Search ............. 354/38, 50, 51, 60 R, 354/60 E

[56] References Cited

U.S. PATENT DOCUMENTS

| 3,971,046 | 7/1976 | Nobusawa | 354/51 |
| 4,006,484 | 2/1977 | Nobusawa | 354/51 |
| 4,112,439 | 9/1978 | Kawasaki et al. | 354/60 R |
| 4,192,586 | 3/1980 | Orban | 354/51 |

OTHER PUBLICATIONS

*Ryoko Giho*, Oct. 1, 1976, vol. 13, No. 154, col. name, "Photographic Apparatus HFM".

*Primary Examiner*—Russell E. Adams

[57] ABSTRACT

A photo-electric converting element converts an incident light into a photo-electric signal corresponding to the illumination of the incident light. The photo-electric signal converted is amplified by a plurality of amplifiers. A discriminating circuit judges under which of a plurality of illumination ranges from low to high illumination the incident light corresponding to the photo-electric signal falls. In accordance with the signal of the judging circuit, an output signal is taken out from the amplifier corresponding to the illumination range of the incident light.

20 Claims, 7 Drawing Figures

LIGHT MEASURING CIRCUIT FOR PHOTOGRAPHIC CAMERAS

CROSS-REFERENCE TO RELATED APPLICATION

This is a continuation-in-part application of U.S. patent application Ser. No. 948,528, filed Oct. 4, 1978, now abandoned.

BACKGROUND OF THE INVENTION

This invention relates to a light measuring circuit.

In photographing, for example, photomicrographing, light-measuring must be made from relatively dark image to bright image, i.e. in a wide illumination range ($10^4$ to $10^5$ luxes) from low to high illumination. Practically, it is very difficult to accurately measure a light over a wide range of illumination. In a conventional light measuring circuit, the incident light is detected in the form of a change of the resistance of a photoelectric converting element such as a CdS element. A photoelectric signal produced corresponding to the resistance change is applied to a logarithmic compression circuit and the incident light is taken out from the logarithmic compression circuit in the form of a voltage signal corresponding to the light intensity. When the logarithmic compression circuit is used, a high accuracy light measuring is assured over a wide illumination range, but the light measuring apparatus is expensive.

SUMMARY OF THE INVENTION

Accordingly, an object of the invention is to provide an inexpensive light measuring circuit which is capable of accurately measuring a light over a wide illumination range.

According to the invention, there is provided a photoelectric converting element converts an incident light into photoelectric signal with a level corresponding to the illumination of the incident light. The photoelectric signal converted is amplified by a plurality of amplifiers. A judging circuit judges which of a plurality of illumination ranges from low to high illumination includes the light corresponding to the photoelectric signal. In accordance with the judging signal of the judging circuit, an output signal is taken out from the amplifier corresponding to the illumination range of the incident light.

Other objects and features of the invention will be apparent from the following description taken in connection with the accompanying drawings.

DETAILED DESCRIPTION OF THE PREFERRED EMBODIMENTS

Figure 1:
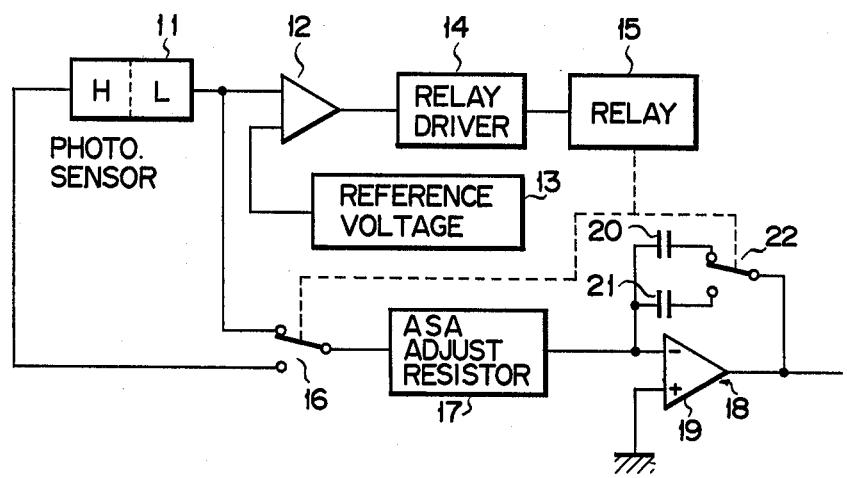
FIG. 1 shows a circuit diagram of an embodiment of a light measuring circuit according to the invention.
Figure 2:
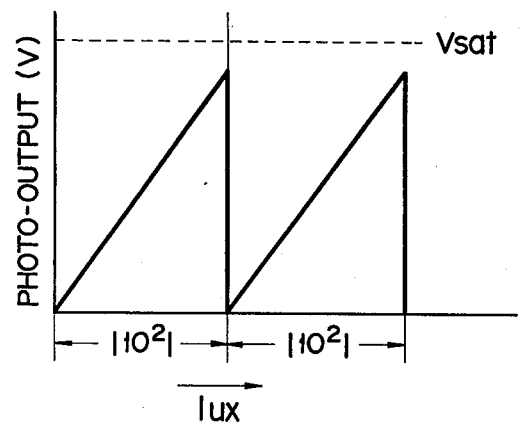
FIG. 2 shows a graphical representation of a range of the intensity of illumination.

Referring now to FIG. 1, a photosensor 11 is so constructed as to produce a high (H) lux or illumination signal and a low (L) lux signal. The output terminal for the L lux signal of the photosensor is connected to one input terminal of a comparator 12. The comparator 12 is connected at the other input terminal to a reference voltage source 13. The output terminal of the comparator 12 is connected to a relay driver 14 of which the output terminal is connected to a relay 15. The normally closed contact and the normally open contact of the relay switch 16 of the relay 15 are connected to the L and H lux terminals of the photosensor 11, respectively. The common contact of the relay switch 16 is connected to an inverted input terminal of an operational amplifier 19 of an integrating circuit 18, through an ASA adjusting resistor circuit 17. The inverted input terminal of the operational amplifier 19 is connected to one ends of integrating capacitors 20 and 21 of which the other ends are connected to the normally closed contact and the normally open contact of a relay switch 22, respectively. The common contact of the relay switch 22 is connected to the output terminal of the operational amplifier 19.

In the light measuring circuit shown in FIG. 1, when the incident light has a low illumination, for example, $10^2$ lux or less, a low lux signal is produced from the photosensor 11. The low lux signal is applied to the comparator 12 where it is compared with a reference voltage. The reference voltage is set to a value slightly higher than the voltage level of the low lux signal but slightly lower than the voltage level of the high lux signal. Accordingly, when the incident light is at low lux, the output signal from the comparator 12 can not drive the relay driver 14, so that the relay 15 is in a deenergized condition. At this time, the relay switches 16 and 22 are connected to the normally closed contacts, respectively. For this, the low lux signal is supplied to the ASA adjust resistor 17, through the normally closed contact of the relay switch 16. The low lux signal is integrated in accordance with an integrating constant defined by the resistance of the resistor 17 and the capacitance of the capacitor 20. The integrated signal is supplied to a display and/or shutter drive circuit where it is displayed and/or drives the shutter.

Assume now that the intensity of the incident light is $|10^4|$ lux and that the illumination intensity of $|10^4|$ lux is divided into a low lux region $|10^2|$ and a high lux region $|10^2|$ lux. The boundary between those lux regions is found by comparing the voltage level of the lux signal from the photosensor 11 with the reference voltage from the reference voltage circuit 13. In other words, the lux region is determined depending on as to if the produced signal is the lux one or the high lux one. The integrating constant of the integrating circuit 18 is set depending on the lux region determined. The lux signal is integrated on the basis of the corresponding integrating constant. In this way, the photosignal is processed depending on the divided lux region, so that it may be amplified linearly.

Figure 3:
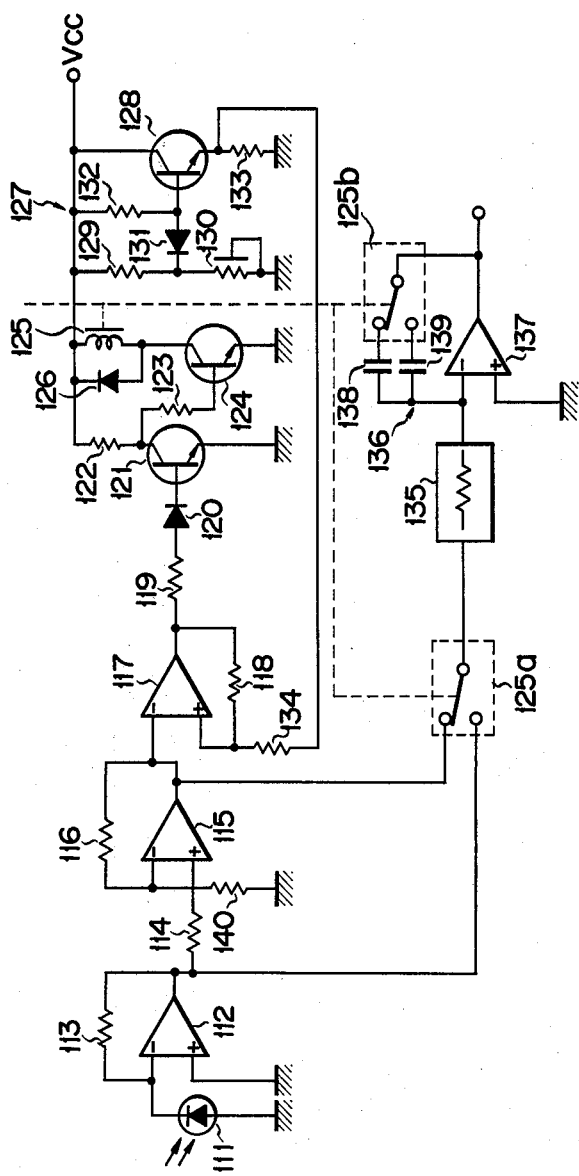
FIG. 3 is a circuit diagram of the light measuring circuit illustrated in block form in FIG. 1.

Turning now FIG. 3, there is shown a circuit of a detail of the measuring circuit shown in FIG. 1. A photoelectric converting element, for example, a photodiode 111, is connected at the cathode to the inverting input terminal of an operational amplifier 112 of first stage. The cathode of the photodiode 111 and the non-inverting input terminal of the operational amplifier 112 are earthed. A resistor 113 is connected between the inverting input terminal of the amplifier 112 and the output terminal. The output of the operational amplifier 112 is connected to the non-inverting input terminal of an operational amplifier 115 of the subsequent stage, through a resistor 114. The inverting input terminal of the operational amplifier 115 is connected through a resistor 116 to the output terminal of the same amplifier and through a resistor 140 to ground. The output terminal of the operational amplifier 115 is connected to the inverting input terminal of an operational amplifier 117 of a third stage. The output terminal of the third stage amplifier 117 is connected through a resistor 118 to the non-inverting input terminal of the same amplifier and to the base of an NPN transistor 121 by way of a resistor 119 and a forward diode 120. The transistor 121 is connected at the emitter to ground and at the collector to a power source Vcc via a resistor 122 and to the base of an NPN transistor 124 via a resistor 123. The transistor 124 is connected at emitter to ground and at the collector to the power source terminal Vcc via a relay 125 and a diode 126. In a reference voltage circuit 127, an NPN transistor 128 is connected at its base to a connecting point between a resistor 129 and a variable resistor 130 these being connected in series between the terminal Vcc and ground and to the terminal Vcc through a resistor 132. The transistor 128 is connected at the emitter to ground through a resistor 133 and to the non-inverting input terminal of the third stage amplifier 117 through a resistor 134, and at the collector to the terminal Vcc.

In the relay 125, the normally-closed contact and the normally-open contact of a first relay switch 125a are connected to the output terminals of the amplifiers 112 and 115, respectively. The movable contact of the relay switch 125a is connected to the inverting input terminal of an operational amplifier 137 in an integrator 136 through a resistor circuit 135 which is adjusted in accordance with the ASA number of a film. The inverting input terminal of the operational amplifier 137 is connected to the normally closed contact and the normally open contact of a relay switch 125b through capacitors 138 and 139. The movable contact of the relay switch 125b is connected to the output terminal of the output terminal of the operational amplifier 137. The operational amplifier 137 is connected at the non-inverting input terminal to ground.

In operation, when light with low illumination, for example, $10^2$ luxes or less is incident upon the light measuring circuit thus constructed, the photodiode, upon receipt of the incident light, produces a signal corresponding to the illumination. The signal, i.e. the photoelectric signal is amplified by the first stage amplifier 112 and then is inputted to the second stage amplifier 115. The photoelectric signal further amplified is applied to the third amplifier 117. The third amplifier 117 serves as a comparator for comparing a reference voltage of the reference voltage circuit 127 with the photoelectric signal from the operational amplifier 115. The reference voltage circuit 127 is so designed as to produce a reference voltage slightly lower than the saturation voltage of the operational amplifier 127. Accordingly, in the case of low illumination, the operational amplifier is not saturated so that the operational amplifier 117 produces an output of a high level. As a result, the transistor 121 is conductive and the transistor 124 is not conductive and the relay 125 is not actuated. Under this condition, the normally closed contacts of the relay switches 125a and 125b are closed and the output signal of the operational amplifier 115 is applied to the integrator 136 through the normally-closed contact of the relay switch 125a and the resistive circuit 135. In the integrator 136, the relay switch 125b connects the capacitor 138 across the operational amplifier 137. The output signal of the amplifier 115, i.e. the photoelectric signal amplified, is integrated in accordance with the capacitance of the capacitor 138. The integrated photoelectric signal from the integrator 136 is applied to an exposure indicating unit or an exposure meter (not shown).

When light of high illumination, for example, $10^2$ luxes, is incident onto the photodiode 111, the photoelectric signal corresponding to the illumination is produced from the photodiode 111 and is amplified by the operational amplifier 112 and then is applied to the subsequent amplifier 115. Since the photoelectric signal inputted to the amplifier 115 is large, the amplifier 115 is saturated. As previously stated, the reference voltage to be applied to the amplifier 117 is set slightly lower than the saturation amplifier of the amplifier 115. When the saturation voltage is applied to the operational amplifier 117, the output of the amplifier 117 is inverted and the amplifier 117 produces an output signal with a low level. As a result, the transistor 121 is turned off and the transistor 124 is turned on, and the relay 125 is energized. Accordingly, the movable contact of the relay switch 125a is switched to a normally open contact and the output signal of the operational amplifier 112 is applied to the integrator 136 through the normally open contact of the relay switch 125a and the resistor circuit 135. At this time, the movable contact of the relay switch 125b is switched to a normally open contact so that the capacitor 139 is connected to the operational amplifier 137.

Figure 4:
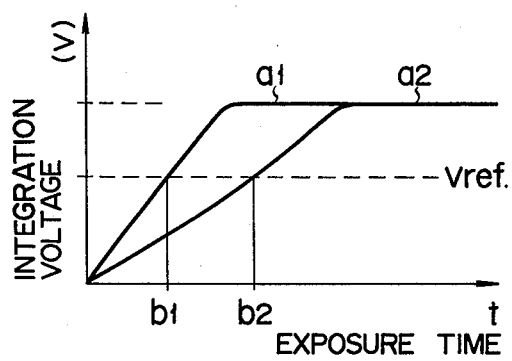
FIG. 4 is a graphical representation illustrating a relation between exposure time and integrated circuit in the measuring circuit shown in FIG. 3.

The time constant of the integrating circuit 136 is set against the low and high luxes in the following. As shown in FIG. 4, when the illumination is low lux, the time constant is set small. On the other hand, when it is high, the time constant is large. The time constant are set by selecting the capacitors 138 and 139 through the relay switch 125b. If the light of low lux is incident onto the photodiode, an output signal from the operational amplifier 115 is applied through the relay switch 125a to the integrating circuit 136. Upon receipt the signal, the integrator 136 produces an integrated signal represented by a curve a2 in FIG. 4. An integration time defined by a point b2 is determined on the basis of the integrated signal and displayed as, for example, an exposure time on an indicating means, for example, meter or display device (not shown).

In the case of a high lux, the output signal from the first stage amplifier 112 is integrated by the integrator 136 along an integration curve a1 and an integration time defined by a point b1 are displayed as an exposure time on the indicating means. As seen from the foregoing description, the photoelectric signal of a low lux is amplified by two stage amplifiers and that of a high lux is amplified by one stage amplifier. Further, the amplification is conducted on a linear range, not on a saturated point. Therefore, the accuracy of the light measuring is kept high.

As above described, the operational amplifier 117 changes its output level in response to the low or high of the illumination. That is, the operational amplifier 117 judges whether the incident light is low or high illumination. The signal based on the judgement i.e. the output signal of the operational amplifier 117 controls the relay 125 to lead the output of the operational amplifier 112 or 115 to the integrator 136.

Figure 5:
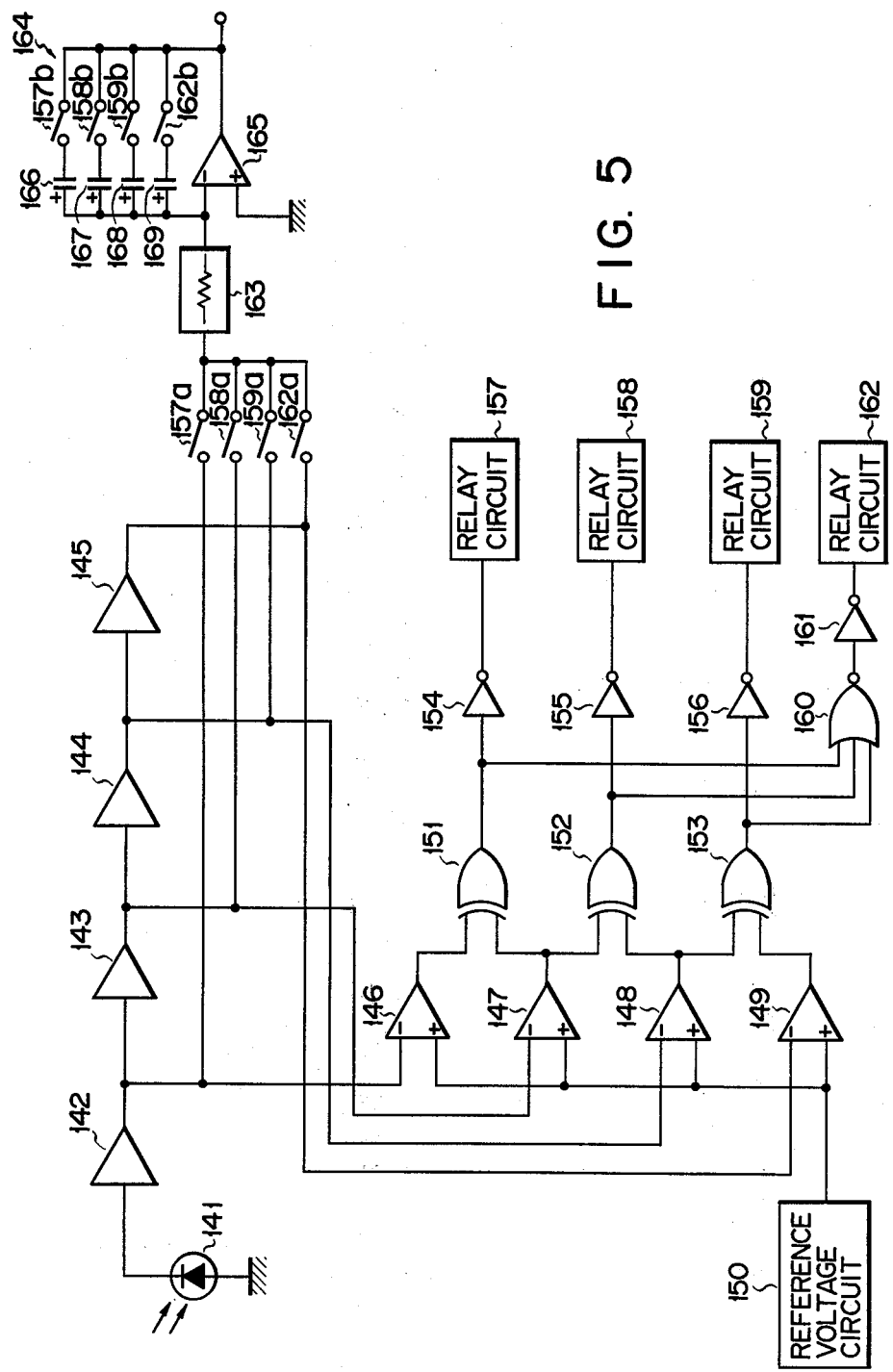
FIG. 5 shows a circuit diagram of a measuring circuit which is another embodiment of the invention.

Turning now to FIG. 5, there is shown another embodiment of the light measuring circuit according to the invention. In the figure, a photodiode 141 is connected to the input of a first stage amplifier 142 of a four series-connected amplifiers 142 to 145. The output terminals of these series-connected amplifiers are connected to the inverting amplifiers 146 to 149, respectively, as shown. The non-inverting input terminals of these amplifiers 146 to 149 are connected commonly to the output of a reference voltage circuit 150. The amplifier 146 is connected at the output terminal to the first input terminal of an exclusive OR circuit 151. The amplifier 152 is connected at the output terminal to the second input terminal of the exclusive OR circuit 151 and to the first input terminal of an exclusive OR circuit 152. Similarly, the amplifier 148 is connected at the output terminal to the second input terminal of the exclusive OR circuit 152 and to the first input terminal of an exclusive OR circuit 153. The amplifier 149 is connected to the second input terminal of the exclusive OR circuit 153. Those exclusive OR gates 151 to 153 are connected at the output terminals to the input terminals of inverters (NOT circuits) 154 to 156, respectively, and also to the input terminals of an NOR gate 160. The output terminals of the inverters 154 to 156 are coupled with relay circuits 157 to 159, respectively. Similarly, the output of the NOR gate 160 is connected through a NOT circuit 161 to a relay circuit 162. The output terminals of the operational amplifiers 142 to 145 are connected to the inverting input terminal of an operational amplifier 165 in an integrator 164, through the corresponding relay switches 157a to 162a of the relays 157 to 162 and a resistive circuit 163. The inverting input terminal of the amplifier 165 is connected to one end of each capacitor 166 to 169 which is further connected at the other end to the output of the same amplifier 165, through the corresponding relay switches 157b to 159b and 162b. The amplifier 165 is grounded at the non-inverting input terminal.

The light measuring circuit thus constructed can measure the incident light by four illumination ranges from dark to bright. The illumination to be measured is assumed to range from 0 to $10^4$ luxes. The first illumination range ranges from 0 to less than 10 luxes; the second illumination range greater than 10 but not exceeding 100 luxes; the third illumination range greater than 100 but not exceeding 1000 luxes; the fourth range greater than 1000 but not exceeding 10000 luxes. When light within the first illumination range strikes on the photodiode 141, the photodiode 141 produces a photoelectric signal with a level corresponding to the illumination of the first illumination range. The photoelectric signal from the diode 141 is amplified by the amplifiers 142 to 145 and then is compared with a reference signal from the reference voltage circuit 150, by means of the operational amplifier 149. The output signal level of the reference voltage circuit is set slightly lower than the saturation voltage of each amplifier 143 to 145. In this case, therefore, a high level signal appears at the output of the amplifier 149. The high level signal is logically processed by the exclusive OR circuit 153 and outputted therefrom as a low level signal which in turn is applied through the NOR gate 160 and the NOT circuit 161 to the relay 162, resulting in energization of the relay circuit 162. At this time, low level signals from the exclusive OR circuits 151 to 153 are coupled through the corresponding NOT circuits 154 to 156 with the corresponding relay circuits 157 to 159, respectively. Therefore, these relays are not energized. Upon the energization of the relay circuit 162, the associated relay switches 162a and 162b are closed. Accordingly, the output signal from the amplifier 145 is applied through the relay switch 162a and the resistive circuit 163 to the inverting input terminal of the operational amplifier 165. That is, the output signal is applied to the integrator 164 comprising the resistive circuit 163, the amplifier 165 and the capacitor 169 and having a time constant determined by the resistance of the resistive circuit 163 and the capacitance of the capacitor 169. The integrator 164 integrates the output signal from the amplifier 145 to produce an integrated signal changing along a curve a1 in FIG. 6.

Figure 6:
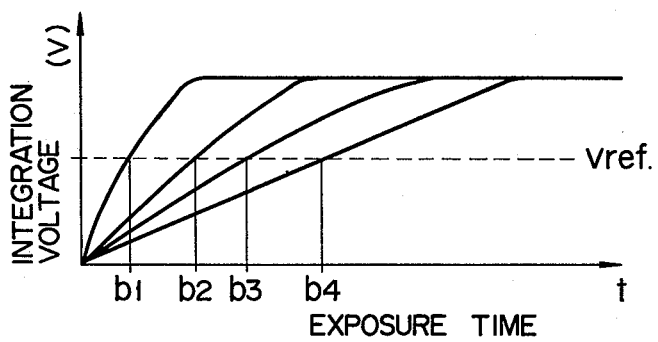
FIG. 6 is a graph for illustrating a relation between exposure time and integrated voltage in the measuring circuit shown in FIG. 5.

An integration time b1 depending on an integrated curve a1 in FIG. 6 is displayed as for example, an exposure time corresponding to the illumination in the first illumination intensity range, by means of, for example, a display device (not shown).

When the light in the second illumination range is incident to the light measuring circuit, the final stage amplifier 145 is saturated and the output of the amplifier 149 is inverted. As a result, the output of the exclusive OR gate 153 becomes high in level which in turn is inverted by the NOT circuit 156 and energizes the relay circuit 159. The high level signal of the exclusive OR gate 153 is also applied to the relay circuit 162, through the NOR gate 160 and the NOT circuit 161, thereby to deenergize the relay circuit 162. The relay circuits 157 and 158 remain deenergized since the output level of the exclusive OR circuits 151 and 152 are low. In this manner, the relay switches 159a and 159b of the relay circuit 159 are closed with the result that the output signal of the amplifier 144 is applied to the integrator 164. In the integrator 164, the output signal is integrated in accordance with the time constant defined by the resistance of the resistive circuit 163 and the capacitance of the capacitor 168. The integrated signal is represented as a curve a2. An integration time b2 depending on the curve a2 is obtained. Similarly, the photoelectric signals corresponding to the light in the third and fourth ranges are amplified and are integrated in accordance with the corresponding time constants, that is to say, along curves a3 and a4, and are taken out from the integrator 164 in the form of the integration times b3 and b4 depending on the corresponding integration curves a3 and a4.

As described above, a wide illumination range from dark to bright is divided into a plurality of ranges and the photoelectric signal corresponding to the illumination range is linearly amplified by the corresponding number of stages. The judgement circuit constituted by the amplifiers 146 to 149 judges the illumination range to which the amplified signal belongs and the judged signal is taken out. Accordingly, the light measuring circuit according to the invention is high in the measurement accuracy and inexpensive in cost.

Figure 7:
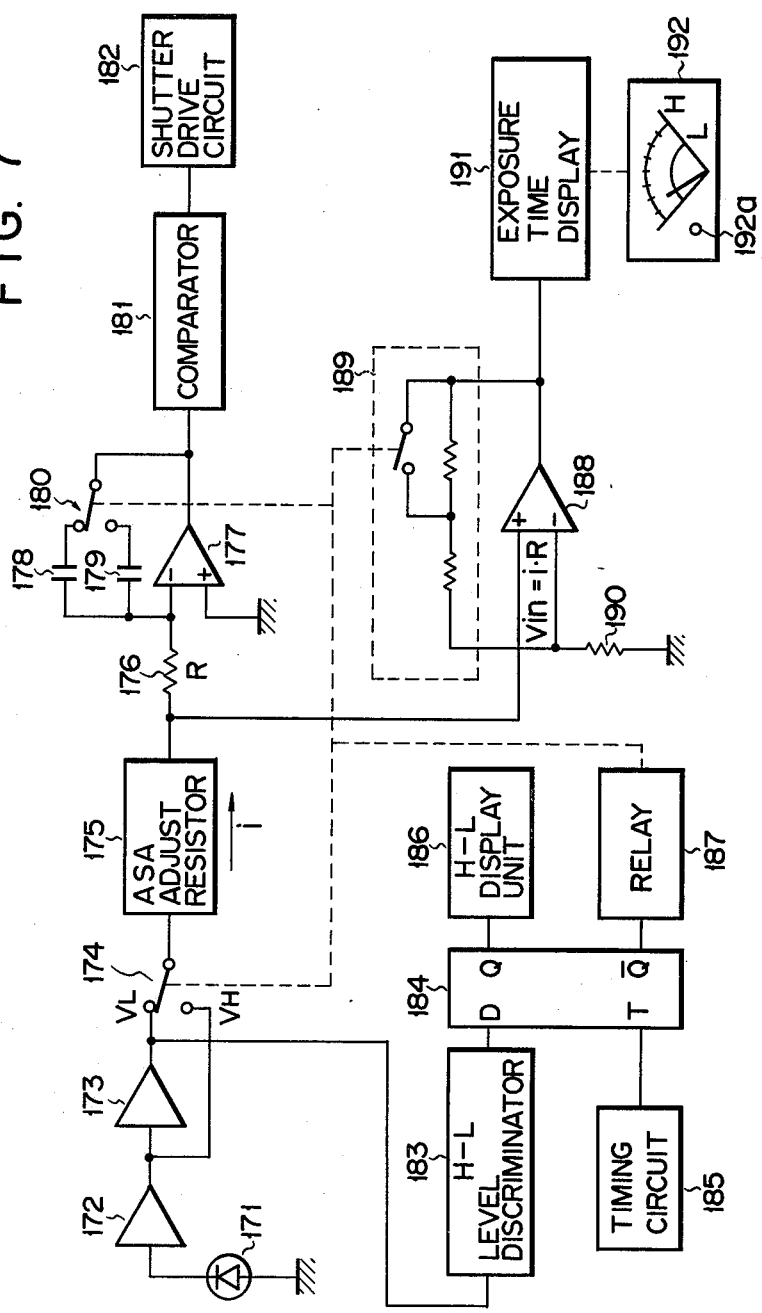
FIG. 7 is a circuit diagram of yet another embodiment of the light measuring circuit according to the invention.

In the embodiment shown in FIG. 7, the cathode of a photodiode 171 is connected to the normally closed contact of a relay switch 174, through amplifiers 172 and 173. The output terminal of the amplifier 172 is connected to the normally open contact of the relay switch 174. The common contact of the relay switch 174 is connected through an ASA adjust resistor circuit 175 to the inverting input terminal of an operational amplifier 177 and to one ends of integrating capacitors 178 and 179. The other ends of those capacitors 178 and 179 are connected to the normally closed contact and the normally open contact of a relay switch 187a, respectively. The common contact of the relay switch 187a is connected to the output terminal of the amplifier 177. The resistors 175 and 176, the operational amplifier 177 and the capacitors 178 and 179 cooperatively form an integrator 180. The output terminal of the integrator 180 is connected to the input terminal of a capacitor 181 which is connected at the output terminal to a shutter drive circuit 182.

The output terminal of the amplifier 173 is connected to the input terminal of a level discriminator 183. The output terminal of the level discriminator 183 is connected to the D input terminal of a D type flip-flop 184. To the T input terminal of the D type flip-flop 184 is connected an H-L switching timing circuit 185. The output terminals Q and $\overline{Q}$ of the D type flip-flop 184 are connected to an H-L display unit 186 and a relay 187, respectively. The output terminal of the ASA adjust resistor circuit 175 is connected to the non-inverting input terminal of an operational amplifier 188. Between the inverting input terminal and the output terminal of the operational amplifier 188 is connected a gain switching circuit 189. The inverting input terminal is grounded through a resistor 190 and the output terminal thereof is connected to an exposure time delay unit 191 and an H-L meter 192.

According to the embodiment shown in FIG. 7, the output signal from the amplifier 173, i.e. the photosignal is supplied to the H-L level discriminator 183 which discriminates the H or L level of the photosignal. When the photosignal is at L level, the output of the discriminator 183 is at L level, so that the output Q of the D type flip-flop 184 becomes at L level. As a result, the high lux is displayed on the H-L display unit 186. Since the output $\overline{Q}$ is at H level, the relay 187 is energized. Upon the energization of the relay 187, the relay switches 174 and 187a are switched to the normally open contacts. Accordingly, the photosignal from the amplifier 172 is supplied to the integrator 180, through the normally open contact of the relay switch 174. The integrator 180 integrates a photosignal on the basis of the integration constant defined by the ASA adjust resistor 175, the resistor 176, and the capacitor 179. The integrated signal is compared with the reference signal in the comparator 181. When the level of the integrated signal reaches the reference signal level, the comparator produces an output signal for application to the shutter drive circuit 182, thereby to drive the shutter.

To the non-inverting input terminal of the operational amplifier 188 is inputted a voltage Vin determined by the current i and the resistor R. The current i is given $$i \propto V_L \text{ or } V_H/\text{ASA resistor (R)}$$

where $V_L$ represents a voltage of the photosignal at the low lux, and $V_H$ represents a voltage of the photosignal at the high lux. A gain switching circuit 189 inserted between the inverting input terminal and the output terminal of the operational amplifier 188 responds to the operation of the relay 187 to switch the gain of the operational amplifier. With the gain set, the input voltage Vin is amplified and the voltage signal of a voltage Vo is outputted from the amplifier 188. The voltage signal is supplied to the exposure time display meter 191. Upon receipt of the voltage signal, a display section 192 of the display meter 191 energizes an L display member 192a to display an exposure time for the low lux.

In the above operation, when the measuring circuit engages in measuring an intensity of light, the output of the timing circuit 185 is at H level, the output signal from the level discriminator 183 is not latched in the flip-flop 184 and the output signal corresponding to a change of H or L level is produced from the flip-flop 184. When the measuring circuit is in the exposure mode, the output signal from the timing circuit 185 becomes at low level, so that the output signal from the discriminator 183 is latched in the flip-flop 184. Accordingly, in the exposure mode, the operation state of the relay 187 is fixed to lock the switch of the H and L of the signal thereby to prevent an erroneous exposure.

The display device used in the embodiment shown in FIG. 7 may display measured light values over a wide range. Since it employs a single meter for display, the construction of the display device is simple and thus inexpensive in cost.

What is claimed is:

1. A light measuring circuit for photographic cameras comprising:
   a photoelectric converting element for receiving an incident light ray to convert the incident light ray into a photoelectric signal;
   a plurality of amplifying circuit which divides a photoelectric signal from said photoelectric converting element in accordance with ranges of the illumination of the incident light and amplifies the photoelectric signal divided;
   a plurality of discriminating circuits corresponding to the number of the divided illumination ranges for judging the illumination range to which the illumination of the incident light belongs, at the boundary between the adjacent illumination ranges;
   switching circuit means selectively driven by an output signal from one of said discriminating circuits corresponding to said illumination range;
   an ASA resistor circuit connected to said discriminating means through said switching circuit means; and
   integrating circuit means for integrating an output signal from said discriminating circuit on the basis of an integrating constant selected by said switching circuit.

2. A light measuring circuit for photographic cameras according to claim 1, wherein said amplifying circuits are differential amplifiers.

3. A light measuring circuit for photographic cameras according to claim 2, wherein said differential amplifiers are connected in cascade fashion.

4. A light measuring circuit according to claim 1, wherein said discriminating circuit is a voltage comparator.

5. A light measuring circuit according to claim 2, wherein a voltage comparator is inserted between each pair of said differential amplifiers connected in cascade.

6. A light measuring circuit according to any one of claims 1 to 5, wherein said switching means is an electromagnetic relay.

7. A light measuring circuit according to any one of claims 1 to 5, wherein said ASA resistor circuit includes a group of resistors for producing a given output signal corresponding to a film used.

8. A light measuring circuit according to any one of claims 1 to 5, wherein said integrating circuit means is comprised of a plurality of capacitors and a differential amplifier.

9. A light measuring circuit according to claim 8, wherein contacts of said electromagnetic relay are arranged in series fashion corresponding to the plurality of capacitors.

10. A light measuring circuit according to claim 9, wherein said series connected capacitors and the circuit contacts of said electromagnetic relay are connected in parallel.

11. A light measuring circuit for photographic cameras comprising:
a photoelectric converting element for receiving an incident light to convert the incident light into a photoelectric signal;
a plurality of amplifying circuit means which divides the photoelectric converted output signal from said photoelectric converting element in accordance with illumination ranges of the incident light and amplifies the photoelectric signal divided;
a plurality of discriminating circuits corresponding to the number of the divided illumination ranges for judging the illumination range to which the illumination of the incident light belongs, at the boundary between the adjacent illumination ranges;
switching circuit means selectively driven by an output signal from said discriminating circuit corresponding to said illumination range;
an ASA resistor circuit connected to said discriminating means through said switching circuit means; and
integrating circuit means for integrating an output signal from said discriminating circuit on the basis of an integrating constant selected by said switching circuit;
wherein an incident light is divided into given illumination ranges, the photoelectric signal from said photoelectric converting element is linearly amplified by a plurality of differential amplifiers provided corresponding to the number of the divided illuminations, it is judged the illumination of the incident light belongs to the illumination range, an output signal from the differential amplifier corresponding to the illumination range judged is integrated, and a light measured output signal resulting from the integration is used as a display signal or an automatic exposure control signal.

12. A light measuring circuit for photographic cameras comprising:
photoelectric converting element for receiving an incident light;
circuit means for dividing a photoelectric signal from said element in accordance with illumination ranges of the incident light;
a discriminating circuit for judging the illumination range to which the illumination of incident light belongs thereby to produce an output signal in accordance with the illumination range judged;
circuit means for selectively controlling an ASA resistor circuit and an integrating constant of an integrating circuit in accordance with the output of a control circuit means; and gain control circuit means for selectively controlling a gain of a light-measured output signal applied through said amplifying circuit means and said ASA resistor circuit in accordance with the output signal from said discriminating circuit means.

13. A light measuring circuit for photographic cameras comprising:
a photoelectric converting element for receiving an incident light to convert the incident light into a photoelectric signal;
amplifying circuit means for dividing a photoelectric converting output signal in accordance with illumination ranges of the incident light;
discriminating circuit means for judging the illumination ranges to which the illumination of the incident light belongs thereby to produce an output signal in accordance with the illumination range judged;
control signal generating means which responds to at least the output signal from said discriminating circuit to produce a control signal;
switching circuit means which responds to a control signal from said control means to control said ASA resistor circuit and an integration constant of an integrating circuit;
a gain control circuit means for selectively controlling a gain of a light measured output applied through said amplifying circuit means and said ASA resistor circuit in accordance with the control signal from said control signal generating means; and
display circuit means for displaying the signal corresponding to the illumination range judged in accordance with the control signal from said control signal generating means.

14. A light measuring circuit for photographic cameras according to claim 13, wherein said gain control circuit is connected to an exposure information display section for displaying exposure information.

15. A light measuring circuit for photographic cameras according to claim 13, wherein said control signal generating means is a D type flip-flop circuit means.

16. A light measuring circuit for photographic cameras according to any one of claims 13 to 15, wherein said amplifying circuit means is a differential amplifier.

17. A light measuring circuit according to any one of claims 13 to 15, wherein said amplifying circuit means is a plurality of differential amplifier means connected in series.

18. A light measuring circuit for photographic cameras according to any one of claims 13 to 15, wherein said discriminating circuit means is a voltage comparator.

19. A light measuring circuit according to claim 13, wherein said switching circuit is an electromagnetic relay.

20. A light measuring circuit according to claim 1, wherein said control signal generating means is a D type flip-flop which is coupled at the input sides with a judged signal corresponding to the judged illumination range, a first signal representing that said light measuring circuit is in the light measuring mode and a second signal representing that said light measuring circuit is in the exposure mode, and at the output with a display circuit for displaying the judged illumination range and said switching circuit means.

* * * * *